United States Patent [19]

Rosane

[11] Patent Number: 5,217,315
[45] Date of Patent: Jun. 8, 1993

[54] LOCKABLE ARTICULATING JOINT AND A FOLDABLE STRETCHER FRAME INCLUDING SAME

[75] Inventor: Randy R. Rosane, Vancouver, Wash.

[73] Assignee: Lifeport, Inc., Vancouver, Wash.

[21] Appl. No.: 912,091

[22] Filed: Jul. 9, 1992

[51] Int. Cl.[5] ........................ F16D 1/12; F16C 11/00
[52] U.S. Cl. ........................................ 403/102; 5/627;
403/62; 403/78; 403/100; 403/117; 403/165
[58] Field of Search ........................ 403/53, 95, 57, 62,
403/287, 100, 102, 78, 79, 165, 117, 113; 5/81.1,
86.1, 625, 626, 627; 135/46; 16/347, 376

[56] References Cited

U.S. PATENT DOCUMENTS

| | | |
|---|---|---|
| 1,906,218 | 4/1933 | Patchell . |
| 2,400,155 | 5/1946 | Letschert et al. . |
| 2,854,261 | 9/1958 | Spaide ................................. 403/53 |
| 3,655,297 | 4/1972 | Bolen, Jr. et al. ..................... 416/72 |
| 3,801,208 | 4/1974 | Bourgraf et al. ...................... 403/95 |
| 4,111,574 | 9/1978 | Runyon ............................ 403/62 X |
| 4,538,393 | 9/1985 | Mitchell ................................ 52/641 |
| 4,611,945 | 9/1986 | Diego .................................... 403/61 |
| 4,711,461 | 12/1987 | Fromberg ......................... 403/57 X |
| 4,865,064 | 9/1989 | Parsons et al. ................. 403/102 X |
| 4,934,025 | 6/1990 | Mariol ............................. 403/102 X |

Primary Examiner—Randolph A. Reese
Assistant Examiner—Christopher J. Novosad
Attorney, Agent, or Firm—Marger, Johnson, McCollom & Stolowitz

[57] ABSTRACT

An articulating joint is provided for use in a foldable frame for a stretcher for example, which is capable of being selectively locked against upward, downward, or lateral folding by rotating the joint relative to the folding frame member.

14 Claims, 3 Drawing Sheets

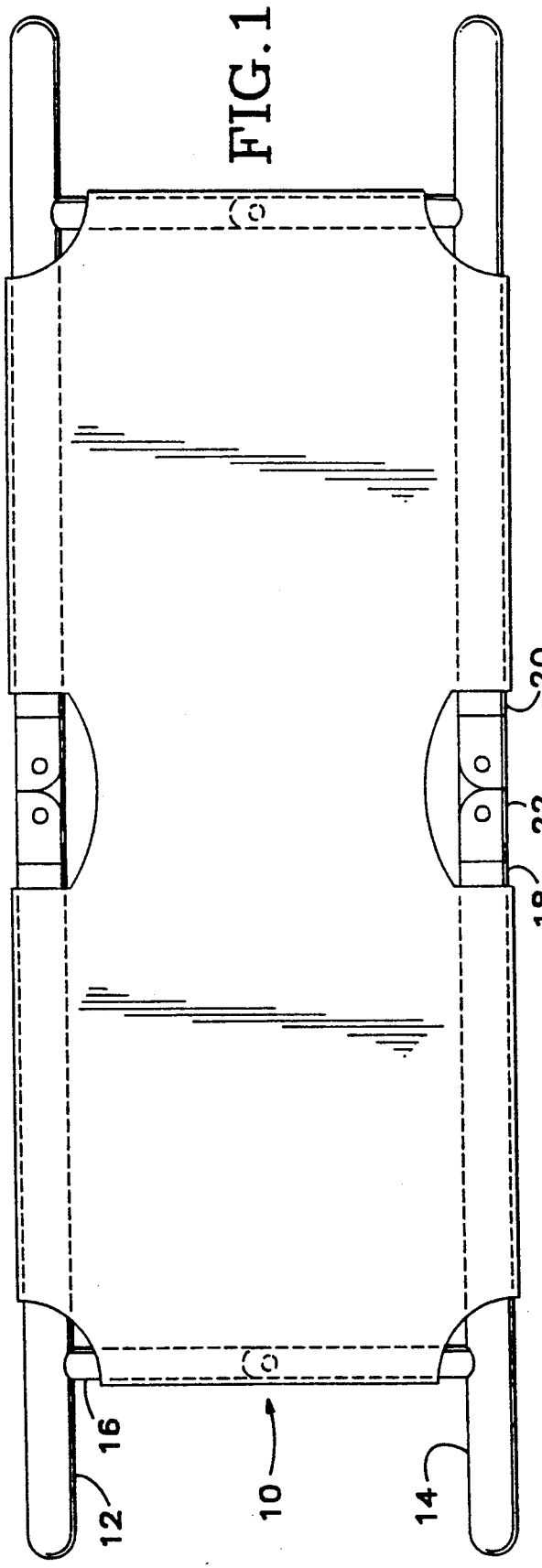
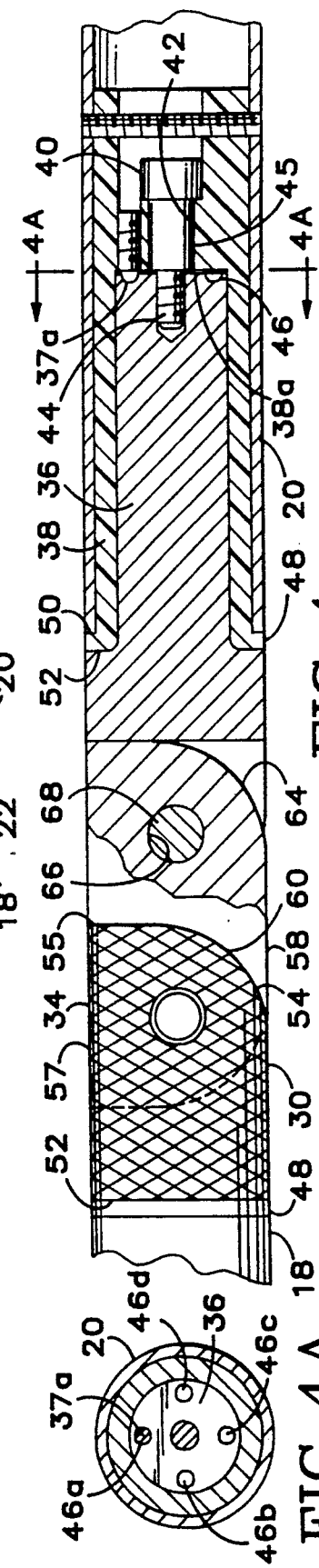

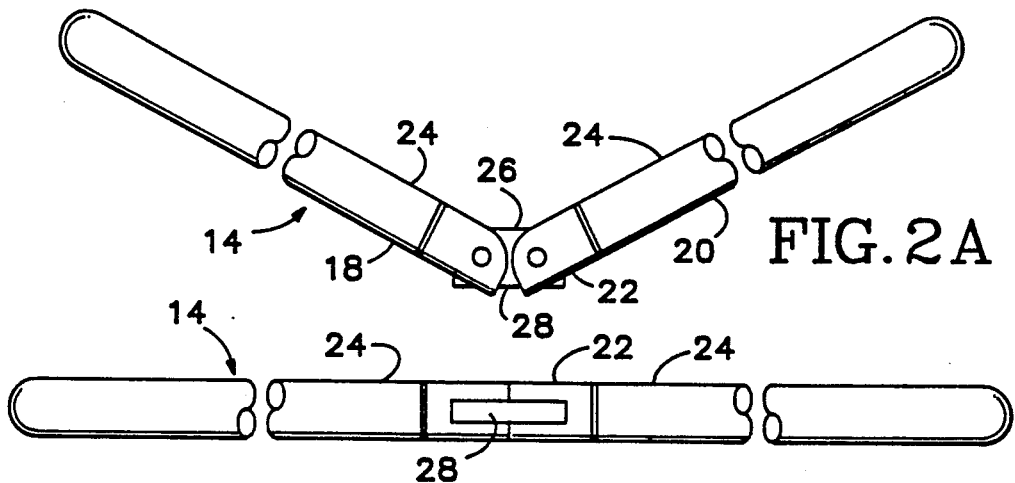
FIG. 2A
FIG. 2B
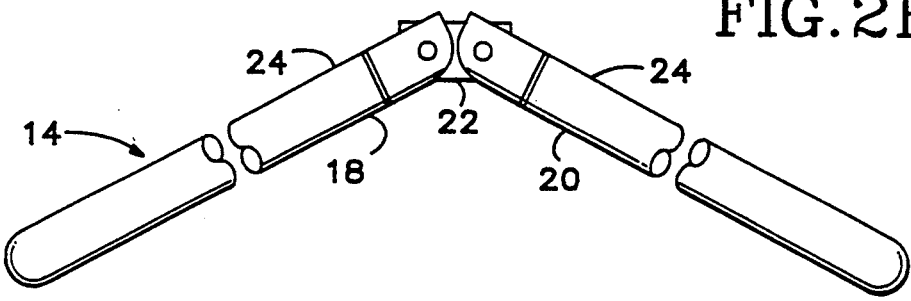
FIG. 2C
FIG. 3A
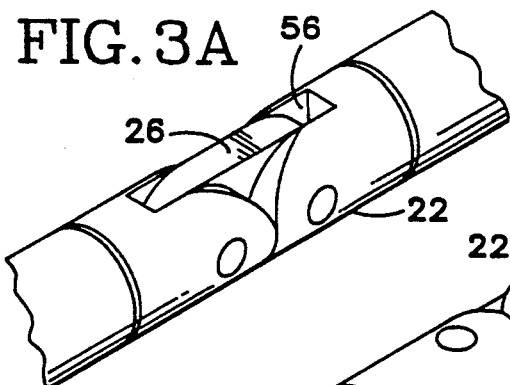
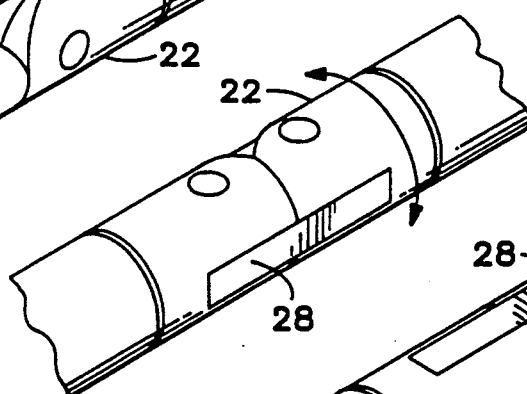
FIG. 3B
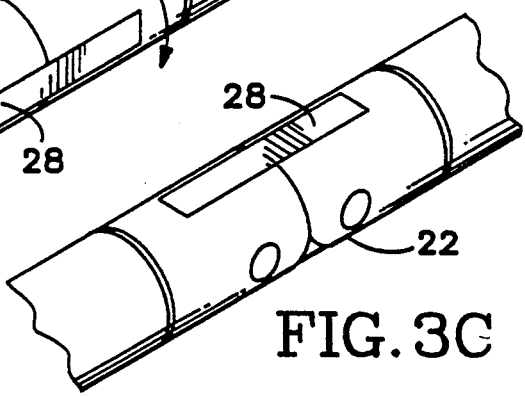
FIG. 3C

LOCKABLE ARTICULATING JOINT AND A FOLDABLE STRETCHER FRAME INCLUDING SAME

BACKGROUND OF THE INVENTION

1. Field of the Invention

The present invention relates to a foldable stretcher for use in transporting non-ambulatory persons, and in particular including an improved articulating joint.

2. Description of Related Art

Stretcher frames for use in transporting non-ambulatory persons are well-known, and are widely used in hospitals, nursing homes and the like, as well as by ambulance and emergency personnel in transporting injured or ill persons from remote locations to a hospital by means of ground or air transport. In such cases, the emergency vehicle must be equipped with stretchers adapted for such use since, in some cases, a stretcher may be used to carry a person some distance to reach an emergency vehicle, or for transporting a person by means of more than one type of vehicle en route to a hospital.

Stretchers may therefore have frames which are foldable or collapsible so that the stretcher may be stored in a relatively small space, and readily carried to a remote location if required. It is also desirable that the frame of a foldable stretcher include a minimum number of components, be light in weight and be easy to operate. Efforts have been made to design stretchers, and stretcher frames in particular, to meet some or all of these requirements.

U.S. Pat. No. 2,400,155 to Letschert discloses a combination stretcher and invalid's reclining chair which has a pair of longitudinal rails connected by a pair of cross members. A pair of inner frames support the stretcher material, and are pivotably mounted on the cross members for lowering a foot rest section and raising a torso support section of the stretcher for converting the stretcher into a chair. The longitudinal rails each include a pair of handle sections attached to the frame rail by means of a sliding pivot joint for folding the handles inwardly toward the center of the rail. The sliding pivot joint, including the end portion of the handle section, is normally disposed entirely within the hollow rail, which "sleeves" the joint and locks it in its extended position. To fold the handles, the handle section end and pivoting joint is pulled axially partially out of the frame rail, and the handle folded over to lay against the frame rail.

U.S. Pat. Nos. 3,655,297 to Bolen et al and 4,611,945 to Diego each disclose articulating joints for use in coupling tubular members, and which may be used in constructing a stretcher frame. U.S. Pat. No. '297 to Bolen et al discloses a coupling for a paddle or the like having a first end rigidly attached within the end of a first tube, and having a second end slidingly and rotatably retained within the second tube by a nut fixed within the second tube which engages the raised threads at each end of a rod extending from the coupling end. The joint is fixed in its rigid configuration by sliding the pivoting portions 16, 18, and 24 of the joint into the second tube 10, and the joint in place there by engaging threads 32 in nut 26. To collapse the joint, tube 12 is rotated relative to tube 10 to disengage threads 32 from nut 26, tubes 10 and 12 are pulled apart to expose the pivoting parts of the joint, and tubes 10 and 12 are folded parallel. The '297 joint is not suitable for use where tubes 10 and 12 are rotationally or axially fixed with respect to one another as is often the case with a stretcher frame.

U.S. Pat. No. '945 to Diego discloses an articulating joint which, when in its rigid position, is housed within tubular members 10 and 12, and which is held in its locked position by biased pins 24 a and b engaged in holes 28 and 30. Pins 24 a and b rotationally fix the joint with respect to each tubular member. To flex the joint, the pins are pulled out from their holes, the tubes are pulled apart, and the tubular members pivoted. The '945 joint is not suitable for use where tubes 10 and 12 are axially fixed with respect to one another, as is often the case with a stretcher frame.

U.S. Pat. No. 1,906,218 to Patchell discloses an articulating joint comprising a link pivotally connecting the mitered ends of abutting shafts, and a sliding sleeve for locking the joint in its rigid position.

Each of the above disclosed joints is further limited in that each provides only a single available direction of folding for the frame relative to the one or both of the tubular members.

A need remains therefore for a foldable stretcher frame incorporating an articulating joint which allows the tubular members to be locked against upward or downward flexing, or folded either upwardly or downwardly relative to the joint; and which can be readily operated to flexing or locking positions while the tubular members remain rotationally and axially fixed relative to each other.

SUMMARY OF THE INVENTION

The present invention meets the need for a foldable stretcher frame by providing a stretcher frame having a pair of foldable longitudinal frame members, each of which can be readily rotated independently of the longitudinal frame member to allow the stretcher frame to be folded either upwardly or downwardly, or lock against upward or downward folding. An articulating joint, according to the present invention, does not require the sections of the longitudinal frame member to be pulled apart for selecting an alternate configuration.

The present invention may be embodied in an articulating joint for coupling two elongated members comprising first and second pivoting members. Each pivoting member comprising an inner end, an outer end, and a longitudinal axis connecting said inner and outer ends, each respective pivoting member outer end comprising means for rotatably attaching an elongated member to said pivoting member in a substantially fixed axial position relative to said pivoting member. An articulating joint according to the present invention also includes a connector for pivotably connecting said first and second pivoting members by their respective inner ends, said connector having a first portion and a second portion, the connector having a longitudinal axis connecting said first and second connector portions;

The first pivoting member is pivotably connected to said first connector portion, and said second pivoting member is pivotably connected to second connector portion, said first and second pivoting members each being rotationally fixed relative to the other. Each pivoting member is pivotable to a first position in which its longitudinal axis is substantially parallel with said articulating joint longitudinal axis. The articulating joint is rotatable about its longitudinal axis to a first selectable position where each said pivoting member is pivotable downwardly relative to said connector portion, to a second selectable position where each said pivoting member is pivotable upwardly relative to said connector portion; and to a third selectable position where each said pivoting member is locked against upward or downward pivoting relative to said connector portion.

The first and second elongated members may comprise a first and second tube, and said elongated member receiving means may comprise a shaft protruding from each respective outer end of said first and second pivoting members, a bushing rotatably mounted on each said shaft, the bushing for being received within the open end of a tube.

The first and second pivoting members of an articulating joint according to the present invention may each include a slot in their respective inner ends. The first and second connector portions may be pivotably connected to said first coupling member within its slot, and the second connector portion may be pivotably connected to said second coupling member within its longitudinal slot. The first and second connector portions each include an arcuate surface about which said first and second respective coupling members are pivotable.

Each said pivoting member may be pivotable downwardly relative to said connector portion to a second position in which its longitudinal axis is substantially perpendicular to said connector longitudinal axis, and upwardly relative to said connector portion to a second position in which its longitudinal axis is substantially perpendicular to said connector longitudinal axis.

The present invention may be embodied in an articulating frame including first and second frame members and an articulating joint, an improved articulating joint as just described.

The present invention may also be embodied in a foldable stretcher frame comprising a pair of parallel articulating frame section and means for interconnecting said pair of longitudinal frame sections, such as transverse frame members. Each said articulating frame section comprising first and second frame members connected by an articulating joint as described above. Each articulating frame section may include a third frame member connected to the second frame member by a second like articulating joint.

The present invention will now be explained in greater detail by reference to the figures and description of the preferred embodiment.

BRIEF DESCRIPTION OF THE FIGURES

FIG. 1 is a plan view of a stretcher incorporating a pair of articulating joints according to the present invention.

FIG. 2A is a side schematic view of a longitudinal frame member and an articulating joint according to the present invention configured so that the frame member is foldable upwardly.

FIG. 2B is a side schematic view of a longitudinal frame member and an articulating joint according to the present invention configured so that the frame member is locked against upward or downward folding.

FIG. 2C is a side schematic view of a longitudinal frame member and an articulating joint according to the present invention configured so that the frame member is foldable downwardly.

FIG. 3A is a perspective view of a portion of a longitudinal frame member and an articulating joint according to the present invention configured so that the frame member is foldable upwardly.

FIG. 3B is a perspective view of a portion of a longitudinal frame member and an articulating joint according to the present invention configured so that the frame member is locked against upward or downward folding.

FIG. 3C is a perspective view of a portion of a longitudinal frame member and an articulating joint according to the present invention configured so that the frame member is foldable downwardly.

FIG. 4 is a partially cut away side cross-sectional view of an articulating joint according to the present invention.

FIG. 4A is an end cross-sectional view along line 4A—4A in FIG. 4.

DETAILED DESCRIPTION OF THE PREFERRED EMBODIMENT

Figure 5:
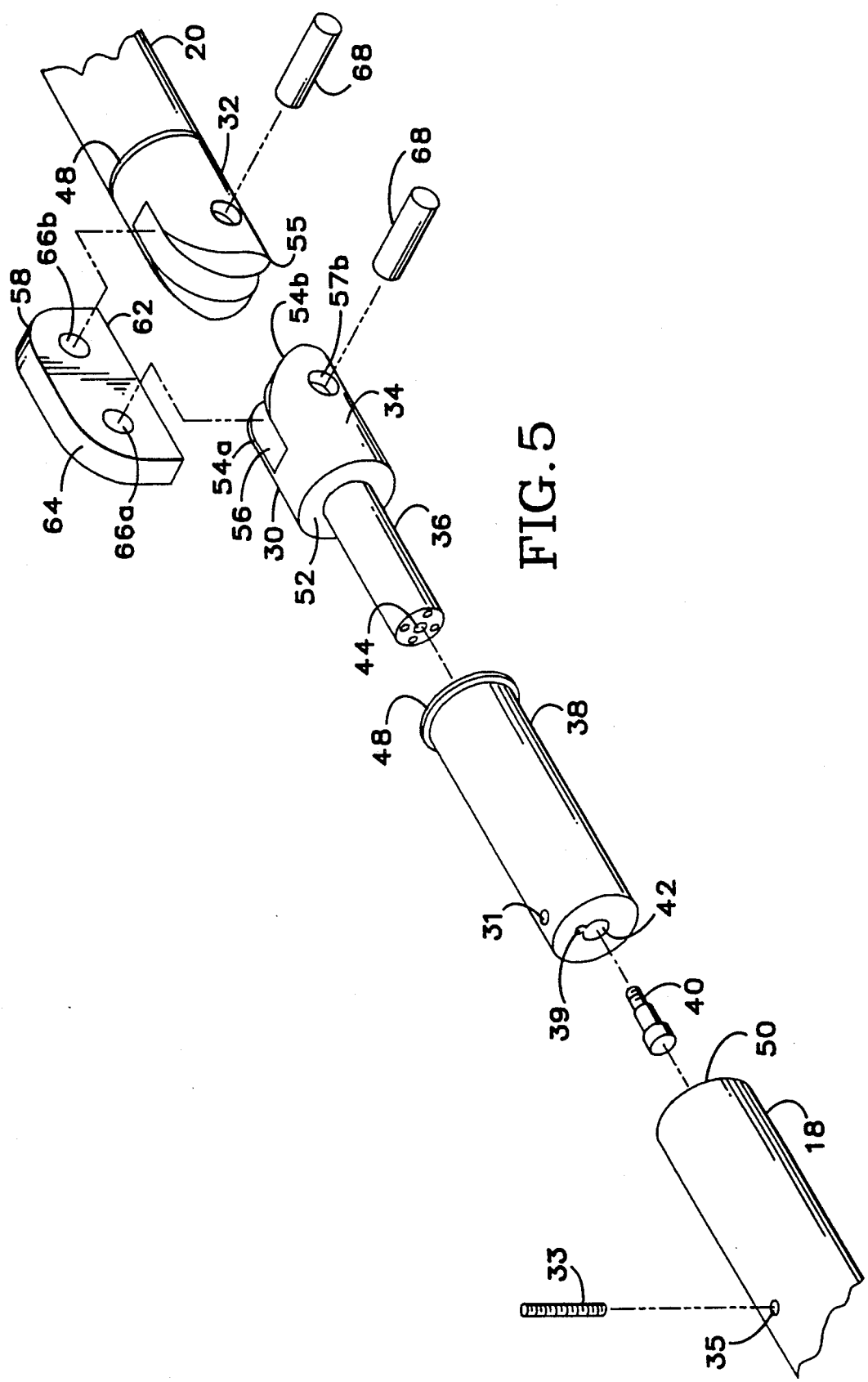
FIG. 5 is an exploded perspective view of a portion of a longitudinal frame member and an articulating joint according to the present invention configured so that the frame member is foldable upwardly.

Referring to FIG. 1, a stretcher having an articulating frame according to the present invention is shown generally at 10. The stretcher frame 12 includes longitudinal members 14 and transverse members 16. Each longitudinal member 14 includes first and second tubular members 18 and 20 connected by an articulating joint 22 according to the present invention. As shown in FIGS. 2A–C, articulating joint 22 permits stretcher 10 to be folded upwardly, locked in an extended position, or folded downwardly as required. In each of these configurations, tubular members 18 and 20 remain rotationally fixed relative to each other and to stretcher 10 as indicated by the fixed rotational position of longitudinal member upper surface 24. Each of the configurations of FIGS. 2A–C is selected by rotating joint 22 relative to tubular members 18 and 20 as best seen in FIGS. 3A–C, which correspond to FIGS. 2A–C respectively.

Articulating joint 22 may be considered to have an inner longitudinal surface 26 corresponding to the longitudinal surface of the joint which is partially covered when joint 22 is in its folded position (FIG. 2A). When joint 22 is rotated to position its inner surface 26 upwardly, as shown in FIGS. 2A and 3A, tubular members 18 and 20 are foldable upwardly, and are locked against folding downwardly or transversely. When joint 22 is rotated to position its inner surface 26 to the inner side of frame 12, as shown in FIGS. 1,2B and 3B, tubular members 18 and 20 are locked against folding either upwardly, downwardly, or transversely inwardly by joint 22. When joint 22 is rotated to position its inner surface 26 downwardly, as shown in FIGS. 2C and 3C, tubular members 18 and 20 are foldable downwardly, and are locked against folding upwardly or transversely. Joint 22 is rotatable to any of these positions while tubular members 18 and 20 remain rotationally and axially fixed relative to each other and to transverse members 16.

This feature of the present invention provides a number of significant advantages over known stretcher frames and articulating joints since it provides the variety of configurations and the added structural rigidity resulting from fixed attachment of longitudinal members 14 to transverse members 16. An additional advantage is that joints 22 are quite simple to operate, the user merely rotates joint 22 90° or 180° to achieve any desired configuration. It is not necessary to pull tubular members 18 and 20 apart to change configurations. This feature permits stretcher 10 to be readily folded from a flat configuration to a configuration where one end is folded upwardly 90° and the patient is sitting rather than lying down, all while the patient remains on the stretcher. A further advantages lies in the fact that joint 22 remains exposed in all of its configurations, allowing it to be readily cleaned and inspected. These represents a significant consideration in the suitability of an articulating joint 22 in medical uses, and particularly in medical air transportation, wherein such equipment is subject to stringent inspection and performance requirements.

Turning now to FIGS. 4 and 5, the construction and operation of articulating joint 22 will now be explained in greater detail. Articulating joint 22 consists generally of a pair of like pivoting members 30 and 32 pivotably attached to a connector link 58. FIG. 4 shows a side view of joint 22 connected to tubular members 18 and 20 to form longitudinal member 14 (FIG. 1), including a partial cutaway of joint 22 to show the details of pivoting member 32 within tubular member 20. FIG. 5 shows an exploded perspective view of joint 22 and its components. Each pivoting member includes head 34, shaft 36 and bushing 38. Bushing 38 is preferably made from a polymeric material such as Delrin ®, available from E.I. DuPont and de Nemours & Co. Inc.. Those skilled in the art will recognize that other materials having a combination of suitable strength and surface friction may be used for the construction of bushing 38 as well.

Bushing 38 is rotatably fixed on shaft 36 by shoulder bolt 40 which passes through hole 42 and engages threaded hole 44 in shaft 36. Shoulder bolt 40 includes shoulder 45 which allows bushing 38 to freely rotate on shaft 36. Bushing 38 is rigidly attached to tubular member 18 by a size 10–32 threaded pin 33 inserted through hole 35 in tubular member 18, and engaged with threaded holes 31 in bushing 38. Pivoting member 30 is thereby free to rotate with relation to tubular member 18. Pivoting member 32 is likewise attached to tubular member 20.

Bushing 38 preferably includes spring loaded ball plunger 37 engaged in threaded hole 39, which has a ball 37a extending slightly beyond surface 38a of bushing 38 (FIG. 4). End surface of shaft 36 has four detent holes 46a-d, for receiving ball 37a extends past surface 38a. Three holes 46a-c, and ball 37a cooperatively define selectable rotational positions of bushing 38 relative to shaft 36 wherein ball 37a is disposed in one of holes 46a-c. These rotational positions correspond to configurations of the longitudinal members 18 as discussed above and shown in FIGS. 2A-C and 3A-C. The fourth hole, 46d, is provided in the preferred embodiment to allow joint 22 to be used interchangeably on either side of a stretcher frame 12.

Bushing 38 includes flange 48 for providing a bushing surface between end 50 of tubular member 18 and rear surface 52 of pivoting member head 34. As shown in FIG. 5, head 34 is formed to include flanges 54a and 54b which together define a slot 56. Flanges 54a and 54b have coaxial transverse holes, 57a and 57b respectively, formed therein for attaching pivoting member 32 to connecting link 58 as described below. Flanges 54a and 54b each have a straight longitudinal edge 57 ending at flange corner 55 which is square when viewed from the side (FIG. 4), and an arcuate longitudinal edge forming a rounded flange surface 60.

Pivoting members 30 and 32 are positioned opposite one another with their flanges 54a and 54b pivotably connected to connector link 58, one end of which is disposed in each of slots 56a and 56b. Connector link 58 is a flat member having a straight longitudinal edge 62 and a curved longitudinal edge 64. Connector 58 has a pair of transverse holes 66a and 66b, one near each end. To assemble joint 22, curved connector edge 64 and the respective curved flange surfaces of pivoting members 30 and 32 are aligned with one end of connector link 58 in the slot 56 of each pivoting member. Hole 66a is aligned with hole 57a and 57b of pivoting member 30, and hole 66b is likewise aligned with holes 57a and 57b of pivoting member 32. A pivot pin 68 is then inserted into the aligned holes of each pivoting member to attach them to connector link 58. Each pivot pin 68 has a diameter which provides an interference fit in holes 66a and 66b. Holes 57a and 57b have a diameter which allows a sliding fit of pivot pin 68 therein, thereby permitting each of pivoting members 30 and 32 to freely pivot about its respective pivot pin 68, and connector 58. Tubular members 18 and 20 are now pivotable about connector link 58 along curved connector edge 64. Joint 22 may be rotated relative to longitudinal member 14 to position curved connector edge 64 up, down or to the side to allow longitudinal member 14 to be folded either upwardly, downwardly or to be locked against either upward or downward folding respectively. Rotation of joint 22 from one position to another requires only that a user grasp joint 22 by the heads 34 of pivoting members 30 and 32 and twist. The outer surface of the heads 34 are preferable patterned to minimize slipping of the hands while turning joint 22.

Pivoting members 30 and 32, connector link 58 and pivot pins 68 are preferably made from aluminum for a combination of strength and light weight, but a wide range of metal and polymeric materials will suffice.

Having described my invention in terms of the preferred embodiment, those skilled in the art will recognize that numerous modifications in detail and materials are possible without departing from the spirit and scope of the invention. I claim all such modifications.

I claim:

1. An articulating joint for coupling two elongate members, comprising:
   first and second pivoting members, each pivoting member comprising an inner end, and an outer end, said respective inner and outer ends defining first and second pivoting member longitudinal axes;
   a first elongate member connector rotatably connected to the first pivoting member outer end;
   a second elongate member connector rotatably connected to the second pivoting member outer end;
   a connector having first and second connector portions, said first and second connector portions defining a longitudinal connector axis;
   said first pivoting member pivotably connected by its inner end to said first connector portion in a fixed rotational position relative to said longitudinal connector axis, and said second pivoting member pivotably connected by its inner end to said second connector portion in a fixed rotational position relative to said longitudinal connector axis;
   each pivoting member being pivotable through a range to a first position in which its longitudinal axis is aligned with said longitudinal connector axis;

said connector and first and second pivoting members being rotatable about its longitudinal axis to a first selectable position relative to said first and second elongate member connectors whereat each said pivoting member is pivotable in a first direction relative to said connector;

said connector and first and second pivoting members being rotatable about its longitudinal axis to a second selectable position relative to said first and second elongate member connectors whereat each said pivoting member is pivotable in a direction opposite to said first direction relative to said connector; and said connector and first and second pivoting members being rotatable about its longitudinal axis to a third selectable position relative to said first and second elongate member connectors whereat each said pivoting member is locked against pivoting relative to said connector.

2. An articulating joint according to claim 1 in which said first and second pivoting member inner ends include means defining first and second longitudinal slots respectively, and wherein said first connector portion is pivotably received within said first longitudinal slot, and wherein said second connector portion is pivotably received within said second longitudinal slot.

3. An articulating joint according to claim 1 wherein said first and second connector portions each include an arcuate surface about which said first and second respective pivoting members are pivotable.

4. An articulating joint according to claim 1 wherein said first pivoting member is pivotable relative to said connector to a second position in which the first pivoting member longitudinal axis is substantially perpendicular to said longitudinal connector axis and said second pivoting member is pivotable relative to said connector to a second position in which the second pivoting member longitudinal axis is substantially perpendicular to said longitudinal connector axis.

5. An articulating frame including first and second frame members each frame member including first and second elongate members and an articulating joint, said articulating joint comprising:

first and second pivoting members, each pivoting member comprising an inner end and an outer end, said respective inner and outer ends defining first and second pivoting member longitudinal axes;

first and second frame members;

a first frame member connector rotatably connecting the first frame member to the first pivotal member outer end;

a second frame member connector rotatably connecting the second frame member to the second pivotal member outer end;

a connector having a first connector portion and a second connector portion, said first and second connector portions defining a longitudinal connector axis;

said first pivoting member pivotably connected by its inner end to said first connector portion in a fixed rotational position relative to said longitudinal connector axis and said second pivoting member pivotably connected to second connector portion in a fixed rotational position relative to said longitudinal connector axis;

each pivoting member being pivotable through a range to a first position in which its pivoting member longitudinal axis is aligned with said longitudinal connector axis;

said articulating joint being rotatable about its longitudinal axis to a first selectable position relative to said first and second elongate members whereat each said pivoting member is pivotable in a first direction relative to said connector portion;

said articulating joint being rotatable about its longitudinal axis to a second selectable position relative to said first and second elongate members whereat each said pivoting member is pivotable in a direction opposite to said first direction relative to said connector portion; and said articulating joint being rotatable about its longitudinal axis to a third selectable position relative to said first and second elongate members whereat each said pivoting member is locked against pivoting relative to said connector portion.

6. An articulating joint according to claim 5 in which said first and second pivoting member inner ends include means defining first and second longitudinal slots respectively, and wherein said first connector portion is pivotably received within said first longitudinal slot, and wherein said second connector portion is pivotably received within said second longitudinal slot.

7. An articulating joint according to claim 5 wherein said first and second connector portions each include an arcuate surface about which said first and second respective pivoting members are pivotable.

8. A foldable stretcher frame comprising:

a pair of parallel articulating frame sections;

means for interconnecting said pair of articulating frame sections;

each said articulating frame section comprising first and second frame members connected by an articulating joint, said articulating joint comprising first and second pivoting members, each pivoting member comprising an inner end and an outer end, said respective inner and outer ends defining first and second pivoting member longitudinal axes; a first frame member connector rotatably connecting the first frame member to the first pivoting member outer end; a second frame member connector rotatably connecting the second frame member to the second pivoting member outer end; a connector having a first connector portion and a second connector portion, said first and second connector portions defining a longitudinal connector axis; said first pivoting member pivotably connected by its inner end to said first connector portion in a fixed rotational position relative to said longitudinal connector axis, and said second pivoting member pivotably connected to second connector portion in a fixed rotational position relative to said longitudinal connector axis; each pivoting member being pivotable through a range to a first position in which its pivoting member longitudinal axis is aligned with said longitudinal connector axis; said articulating joint being rotatable about its longitudinal axis to a first selectable position relative to said first and second elongate members whereat each said pivoting member is pivotable downwardly relative to said connector portion; said articulating joint being rotatable about its longitudinal axis to a second selectable position relative to said first and second elongate members whereat each said pivoting member is pivotable upwardly relative to said connector portion; and said articulating joint being rotatable about its longitudinal axis to a third selectable position relative to said first and second elongate members whereat each said pivoting member is locked against upward or downward pivoting relative to said connector portion.

9. An articulating joint according to claim 8 in which said first pivoting member includes means defining a first longitudinal slot in its inner end, and said second pivoting member includes means defining a second longitudinal slot in its inner end, and wherein said first connector portion is pivotably connected to said first pivoting member within said first longitudinal slot, and wherein said second connector portion is pivotably connected to said second pivoting member within said second longitudinal slot.

10. An articulating joint according to claim 8 wherein said first and second connector portions each include an arcuate surface about which said first and second respective pivoting members are pivotable.

11. An articulating joint according to claim 8 having a rotational position whereat each said pivoting member is pivotable relative to said connector portion to a second position in which its longitudinal axis is substantially perpendicular to said longitudinal connector axis.

12. An articulating joint for coupling two elongate members, comprising:
first and second pivoting members, each pivoting member comprising an inner end, an outer end including a shaft, said respective inner and outer ends defining first and second pivoting member longitudinal axes;
a first elongate member connector comprising a first bushing rotatably mounted on the first pivoting member outer end shaft;
a second elongate member connector comprising a second bushing rotatably mounted to the second pivoting member outer end shaft;
a connector having first and second connector portions, said first and second connector portions defining a longitudinal connector axis;
said first pivoting member pivotably connected by its inner end to said first connector portion in a fixed rotational position relative to said longitudinal connector axis, and said second pivoting member pivotably connected by its inner end to said second connector portion in a fixed rotational position relative to said longitudinal connector axis;
each pivoting member being pivotable through a range to a first position in which its longitudinal axis is aligned with said longitudinal connector axis;
said connector being rotatable about its longitudinal axis to a first selectable position relative to said first and second elongate member connectors whereat each said pivoting member is pivotable downwardly relative to said connector;
said connector being rotatable about its longitudinal axis to a second selectable position relative to said first and second elongate member connectors whereat each said pivoting member is pivotable upwardly relative to said connector; and
said connector being rotatable about its longitudinal axis to a third selectable position relative to said first and second elongate member connectors whereat each said pivoting member is locked against upward and downward pivoting relative to said connector.

13. An articulating frame including first and second frame members and an articulating joint, comprising:
an articulating joint comprising first and second pivoting members, each pivoting member comprising an inner end and an outer end having a shaft, said respective inner and outer ends defining first and second pivoting member longitudinal axes; a connector having a first connector portion and a second connector portion, said first and second connector portions defining a longitudinal connector axis; said first pivoting member pivotably connected by its inner end to said first connector portion in a fixed rotational position relative to said longitudinal connector axis, and said second pivoting member pivotably connected to second connector portion in a fixed rotational position relative to said longitudinal connector axis; the first pivoting member being pivotable through a range to a first position in which the first pivoting member longitudinal axis is aligned with said longitudinal connector axis; the second pivoting member being pivotable through a range to a first position in which the second pivoting member longitudinal axis is aligned with said longitudinal connector axis;
first and second frame members;
a first frame member connector comprising a first bushing rotatably mounted on the first pivoting member outer end shaft, the first bushing interlockingly received within an open end of the first frame member, the first frame member thereby pivotably connected to said first frame member connector;
a second frame member connector comprising a second bushing rotatably mounted on the second pivoting member outer end shaft, the second bushing interlockingly received within an open end of the second frame member, the second frame member thereby pivotably connected to said second frame member connector;
said articulating joint being rotatable about its longitudinal axis to a first selectable position relative to said first and second frame members whereat said first and second frame members are pivotable downwardly relative to said articulating joint;
said articulating joint being rotatable about its longitudinal axis to a second selectable position relative to said first and second elongate members whereat said first and second frame members are pivotable upwardly relative to said articulating joint; and
said articulating joint being rotatable about its longitudinal axis to a third selectable position relative to said first and second frame members whereat each said first and second frame members are locked against upward or downward pivotal movement relative to said articulating joint.

14. A foldable stretcher frame comprising:
a pair of articulating frame sections;
means interconnecting said pair of articulating frame sections;
each articulating frame section including first and second frame members and an articulating joint, the articulating joint comprising first and second pivoting members, each pivoting member comprising an inner end and an outer end having a shaft, said respective inner and outer ends defining first and second pivoting member longitudinal axes; a connector having a first connector portion and a second connector portion, said first and second connector portions defining a longitudinal connector axis; said first pivoting member pivotably connected by its inner end to said first connector portion in a fixed rotational position relative to said longitudinal connector axis, and said second pivoting member pivotably connected to second connector portion in a fixed rotational position relative to said longitudinal connector axis; the first pivoting member being pivotable through a range to a first position in which the first pivoting member longitudinal axis is aligned with said longitudinal connector axis; the second pivoting member being pivotable through a range to a first position in which the second pivoting member longitudinal axis is aligned with said longitudinal connector axis;

first and second frame members;

a first frame member connector comprising a first bushing rotatably mounted on the first pivoting member outer end shaft, the first bushing interlockingly received within an open end of the first frame member, the first frame member thereby pivotably connected to said first frame member connector;

a second frame member connector comprising a second bushing rotatably mounted on the second pivoting member outer end shaft, the second bushing interlockingly received within an open end of the second frame member, the second frame member thereby pivotably connected to said second frame member connector;

said articulating joint being rotatable about its longitudinal axis to a first selectable position relative to said first and second frame members whereat said first and second frame members are pivotable in a first direction relative to said articulating joint;

said articulating joint being rotatable about its longitudinal axis to a second selectable position relative to said first and second elongate members whereat said first and second frame members are pivotable in a direction opposite to said first direction relative to said articulating joint; and said articulating joint being rotatable about its longitudinal axis to a third selectable position relative to said first and second frame members whereat each said first and second frame members are locked against pivotal movement relative to said articulating joint.

* * * * *